US010795939B2

(12) United States Patent
Chen et al.

(10) Patent No.: US 10,795,939 B2
(45) Date of Patent: Oct. 6, 2020

(54) QUERY METHOD AND APPARATUS

(71) Applicant: Beijing Baidu Netcom Science and Technology Co., Ltd., Beijing (CN)

(72) Inventors: Liwei Chen, Beijing (CN); Xiao Zhou, Beijing (CN); Dianhai Yu, Beijing (CN); Shiqi Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 316 days.

(21) Appl. No.: 15/933,685

(22) Filed: Mar. 23, 2018

(65) Prior Publication Data

US 2018/0365257 A1   Dec. 20, 2018

(30) Foreign Application Priority Data

Jun. 19, 2017   (CN) .......................... 2017 1 0465229

(51) Int. Cl.
| | | |
|---|---|---|
| *G06F 16/95* | (2019.01) | |
| *G06F 16/9032* | (2019.01) | |
| *G06N 3/04* | (2006.01) | |
| *G06F 16/33* | (2019.01) | |
| *G06F 16/36* | (2019.01) | |
| *G06N 3/08* | (2006.01) | |
| *G06F 40/30* | (2020.01) | |

(52) U.S. Cl.
CPC .... *G06F 16/90324* (2019.01); *G06F 16/3334* (2019.01); *G06F 16/36* (2019.01); *G06N 3/04* (2013.01); *G06N 3/08* (2013.01); *G06F 40/30* (2020.01); *G06N 3/0445* (2013.01); *G06N 3/0454* (2013.01)

(58) Field of Classification Search
CPC ................................................. G06F 16/9535

USPC ......................................... 707/760, 748, 765
See application file for complete search history.

(56) References Cited

U.S. PATENT DOCUMENTS

| | | | | |
|---|---|---|---|---|
| 2013/0159321 A1* | 6/2013 | Bossman | .......... | G06F 16/24542 707/748 |
| 2013/0262498 A1* | 10/2013 | Chen | .................. | G06F 16/2453 707/765 |
| 2017/0285673 A1* | 10/2017 | Kubo | ........................ | G05F 1/56 |

FOREIGN PATENT DOCUMENTS

| | | |
|---|---|---|
| CN | 103106220 A | 5/2013 |
| CN | 105095187 A | 11/2015 |
| CN | 106599278 A | 4/2017 |

* cited by examiner

*Primary Examiner* — Baoquoc N To
(74) *Attorney, Agent, or Firm* — Nixon Peabody LLP

(57) ABSTRACT

A query method and apparatus. A specific implementation of the method comprises: acquiring a target historical query statement from a historical query statement collection; extending the target historical query statement based on a query log to generate an extended statement fragment associated with the target historical query statement; adding the extended statement fragment, as a statement fragment characteristic associated with the target historical query statement, into a statement fragment characteristic library of a preset model; and generating a query result corresponding to a query statement based on the statement fragment characteristic library of the preset model in response to receiving the query statement. According to an embodiment of the present disclosure, the extended statement fragment is added, as the statement fragment characteristic associated with the target historical query statement, into the statement fragment characteristic library of the preset model.

15 Claims, 11 Drawing Sheets

QUERY METHOD AND APPARATUS

CROSS-REFERENCE TO RELATED APPLICATIONS

This application is related to and claims the priority from Chinese Application No. 201710465229.6, filed on Jun. 19, 2017, entitled "Query Method and Apparatus," the entire disclosure of which is incorporated herein by reference.

TECHNICAL FIELD

The present disclosure relates to the field of computer technologies, particularly to the field of Internet technologies, and more particularly, to a query method and apparatus.

BACKGROUND

With the development of information technologies, a growing number of users use the Internet to query information. When querying information over the Internet, in most cases, it is hard for the users to obtain desired query results through one-off query. That is, the information obtained via a query engine generally is fairly low in accuracy.

SUMMARY

The present disclosure provides an improved query method and apparatus to solve the technical problem mentioned in the foregoing Background section.

In a first aspect, an embodiment of the present disclosure provides a query method, which comprises: acquiring a target historical query statement from a historical query statement collection; extending the target historical query statement based on a query log to generate an extended statement fragment associated with the target historical query statement; adding the extended statement fragment, as a statement fragment characteristic associated with the target historical query statement, into a statement fragment characteristic library of a preset model, the preset model comprising a domain recognition model and/or an intent slot recognition model, the domain recognition model being configured to characterize a corresponding relationship between a query statement and a preset domain, a semantic meaning of the query statement belonging to the preset domain, the intent slot recognition model being configured to characterize a corresponding relationship between a query statement and a query intent indicated by the query statement, and a corresponding relationship between a query statement and a limiting keyword of the query intent; and generating a query result corresponding to a query statement based on the statement fragment characteristic library of the preset model in response to receiving the query statement.

In some embodiments, extending the target historical query statement based on a query log to generate an extended statement fragment comprises: performing a word segmentation on the target historical query statement using various preset word segmentation approaches to generate a plurality of statement fragments; and selecting a preset number of statement fragments from the plurality of statement fragments in an order of user selection probabilities from a highest to a lowest as the extended statement fragments, or selecting a statement fragment having a user selection probability higher than a probability threshold as the extended statement fragment, the user selection probability being determined by a number of historical clicks of each statement fragment among each group of statement fragments in the query result recorded in the query log.

In some embodiments, extending the target historical query statement based on a query log to generate an extended statement fragment comprises: performing a word segmentation on the target historical query statement using various preset word segmentation approaches to generate a plurality of statement fragments; and for a statement fragment among the plurality of statement fragments, determining a title of a historical user selection page corresponding to the statement fragment serving as the query statement; performing a word segmentation on the title to generate at least two statement fragments of the title; and determining a weight value of each statement fragment of the title, and determining the statement fragment having a weight value higher than a preset weight threshold as the extended statement fragment.

In some embodiments, extending the target historical query statement based on a query log to generate an extended statement fragment comprises: in response to determining that for a first target fragment in the target historical query statement and a second target fragment in a title of a historical user selection page corresponding to the target historical query statement, a probability in unilateral contextual consistency in the statement is greater than a first preset threshold or a probability in bilateral contextual consistency is greater than a second preset threshold, determining the first target fragment and the second target fragment as synonymous fragments, and determining the second target fragment as the extended statement fragment, a record selected for the historical user selection page being recorded into the query log.

In some embodiments, extending the target historical query statement based on a query log to generate an extended statement fragment comprises: in response to determining that within a designated historical period of time, the first target fragment is positioned in the target historical query statement and a probability of a second target fragment positioned in titles of a plurality of historical user selection pages corresponding to the target historical query statement is greater than a preset threshold, determining the first target fragment and the second target fragment as synonymous fragments, and determining the second target fragment as the extended statement fragment, a record selected for the historical user selection page being recorded into the query log.

In some embodiments, extending the target historical query statement based on a query log to generate an extended statement fragment comprises: determining, based on a deep neural network, a semantic similarity between a first target fragment in the target historical query statement and a second target fragment in a title of a historical user selection page corresponding to the target historical query statement, a record selected for the historical user selection page being recorded into the query log; and in response to determining the semantic similarity is above a preset similarity threshold, determining the first target fragment and the second target fragment as synonymous fragments, and determining the second target fragment as the extended statement fragment.

In some embodiments, after determining the first target fragment and the second target fragment as synonymous fragments, extending the target historical query statement based on the query log to generate the extended statement fragment further comprises: pushing to-be-confirmed synonymous fragment information comprising the first target fragment and the second target fragment to a client; and in response to receiving confirmed synonymous fragment information returned by the client, determining the first target fragment and the second target fragment as confirmed synonymous fragments.

In some embodiments, the method further comprises: in response to determining that the target historical query statement comprises a to-be-confirmed statement fragment and a query intent fragment in a preset query intent fragment collection, determining whether the target historical query statement is present in the query log; and in response to determining that the target historical query statement is present in the query log, adding a specified tag used for indicating a modification function for the to-be-confirmed statement fragment in the statement fragment characteristic library.

In some embodiments, generating a query result corresponding to a query statement based on the statement fragment characteristic library of the preset model comprises: in response to the preset model comprising the domain recognition model and the intent slot recognition model, determining at least one domain recognition model matching the query statement and a preset domain corresponding to the at least one domain recognition model from a plurality of domain recognition models based on the statement fragment characteristic library of each one of the plurality of domain recognition models; for each preset domain, inputting the query statement into the intent slot recognition model corresponding to the preset domain to obtain the query intent indicated by the query statement and the limiting keyword of the query intent based on matching between the query statement and the statement fragment characteristic in the statement fragment characteristic library of the intent slot recognition model; and searching for information matching the query intent and the limiting keyword from an information library, and determining the information searched out as the query result.

In a second aspect, the present disclosure provides a query apparatus, which comprises: an acquiring unit, configured to acquire a target historical query statement from a historical query statement collection; an extending unit, configured to extend the target historical query statement based on a query log to generate an extended statement fragment associated with the target historical query statement; an adding unit, configured to add the extended statement fragment, as a statement fragment characteristic associated with the target historical query statement, into a statement fragment characteristic library of a preset model, the preset model comprising a domain recognition model and/or an intent slot recognition model, the domain recognition model being configured to characterize a corresponding relationship between a query statement and a preset domain, a semantic meaning of the query statement belonging to the preset domain, the intent slot recognition model being configured to characterize a corresponding relationship between a query statement and a query intent indicated by the query statement, and a corresponding relationship between a query statement and a limiting keyword of the query intent; and a generating unit, configured to generate a query result corresponding to a query statement based on the statement fragment characteristic library of the preset model in response to receiving the query statement.

In some embodiments, the extending unit comprises: a word segmenting module, configured to perform a word segmentation on the target historical query statement using various preset word segmentation approaches to generate a plurality of statement fragments; and a determining module, configured to select a preset number of statement fragments from the plurality of statement fragments in an order of user selection probabilities from a highest to a lowest as the extended statement fragments, or select a statement fragment having a user selection probability higher than a probability threshold as the extended statement fragment, the user selection probability being determined by a number of historical clicks of each statement fragment among each group of statement fragments in the query result recorded in the query log.

In some embodiments, the extending unit comprises: a generating module, configured to perform a word segmentation on the target historical query statement using various preset word segmentation approaches to generate a plurality of statement fragments; and a statement fragment generating module, configured to determine, for a statement fragment among the plurality of statement fragments, a title of a historical user selection page corresponding to the statement fragment serving as the query statement; perform a word segmentation on the title to generate at least two statement fragments of the title; and determine a weight value of each statement fragment of the title, and determine the statement fragment having a weight value higher than a preset weight threshold as the extended statement fragment.

In some embodiments, the extending unit comprises: a synonym determining module, configured to determine, in response to determining that for a first target fragment in the target historical query statement and a second target fragment in a title of a historical user selection page corresponding to the target historical query statement, a probability in unilateral contextual consistency in the statement is greater than a first preset threshold or a probability in bilateral contextual consistency is greater than a second preset threshold, the first target fragment and the second target fragment as synonymous fragments, and determine the second target fragment as the extended statement fragment, a record selected for the historical user selection page being recorded into the query log.

In some embodiments, the extending unit further comprises: a pushing module, configured to push to-be-confirmed synonymous fragment information comprising the first target fragment and the second target fragment to a client; and a synonym determining module, configured to determine, in response to receiving confirmed synonymous fragment information returned by the client, the first target fragment and the second target fragment as confirmed synonymous fragments.

According to the query method and apparatus provided by the embodiments of the present disclosure, first, a target historical query statement is acquired from a historical query statement collection. Afterwards, the target historical query statement is extended based on a query log to generate an extended statement fragment associated with the target historical query statement. Next, the extended statement fragment is added, as a statement fragment characteristic associated with the target historical query statement, into a statement fragment characteristic library of a preset model. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. Finally, a query result corresponding to a query statement is generated based on the statement fragment characteristic library of the preset model in response to receiving the query statement. A more accurate search result can be generated by adding the extended statement fragment, as the statement fragment characteristic associated with the target historical query statement, into the statement fragment characteristic library of the preset model.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
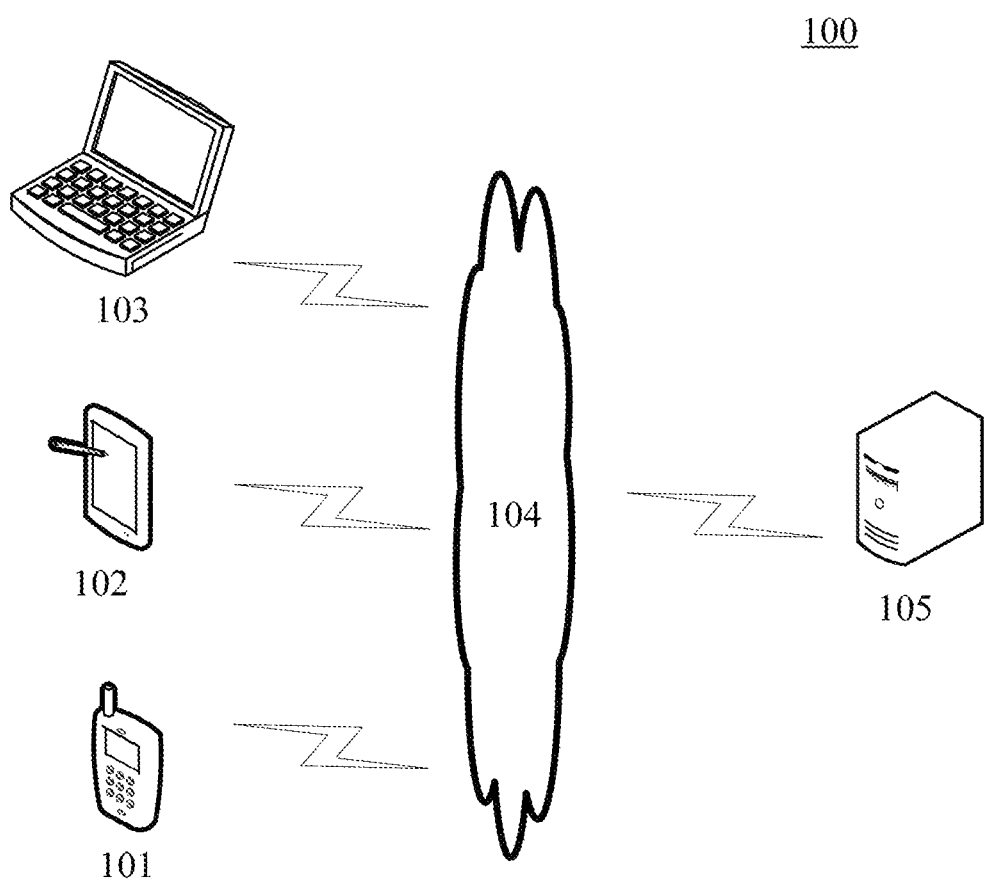
FIG. 1 is an exemplary architecture diagram of a system to which the present disclosure may be applied.

FIG. 1 shows an exemplary architecture of a system 100 to which the query method or the query apparatus according to an embodiment of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as query applications, instant messaging tools, mailbox clients and social platform software may be installed on the terminal devices 101, 102 and 103.

The terminal devices 101, 102 and 103 may be various electronic devices having a display screen and supporting query, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend web server providing support for a query interface displayed on the terminal devices 101, 102 and 103. The backend web server may process, for example, analyze data such as a received query request, and feedback the processing result (such as a query result) to the terminal devices.

It is to be noted that the query method provided by the embodiment of the present disclosure generally is performed by the server 105. Correspondingly, the query apparatus generally is arranged in the server 105.

It is to be understood that the number of the terminal devices, the networks and the servers in FIG. 1 is merely exemplary. Any number of the terminal devices, the networks and the servers may be provided as required.

Figure 2:
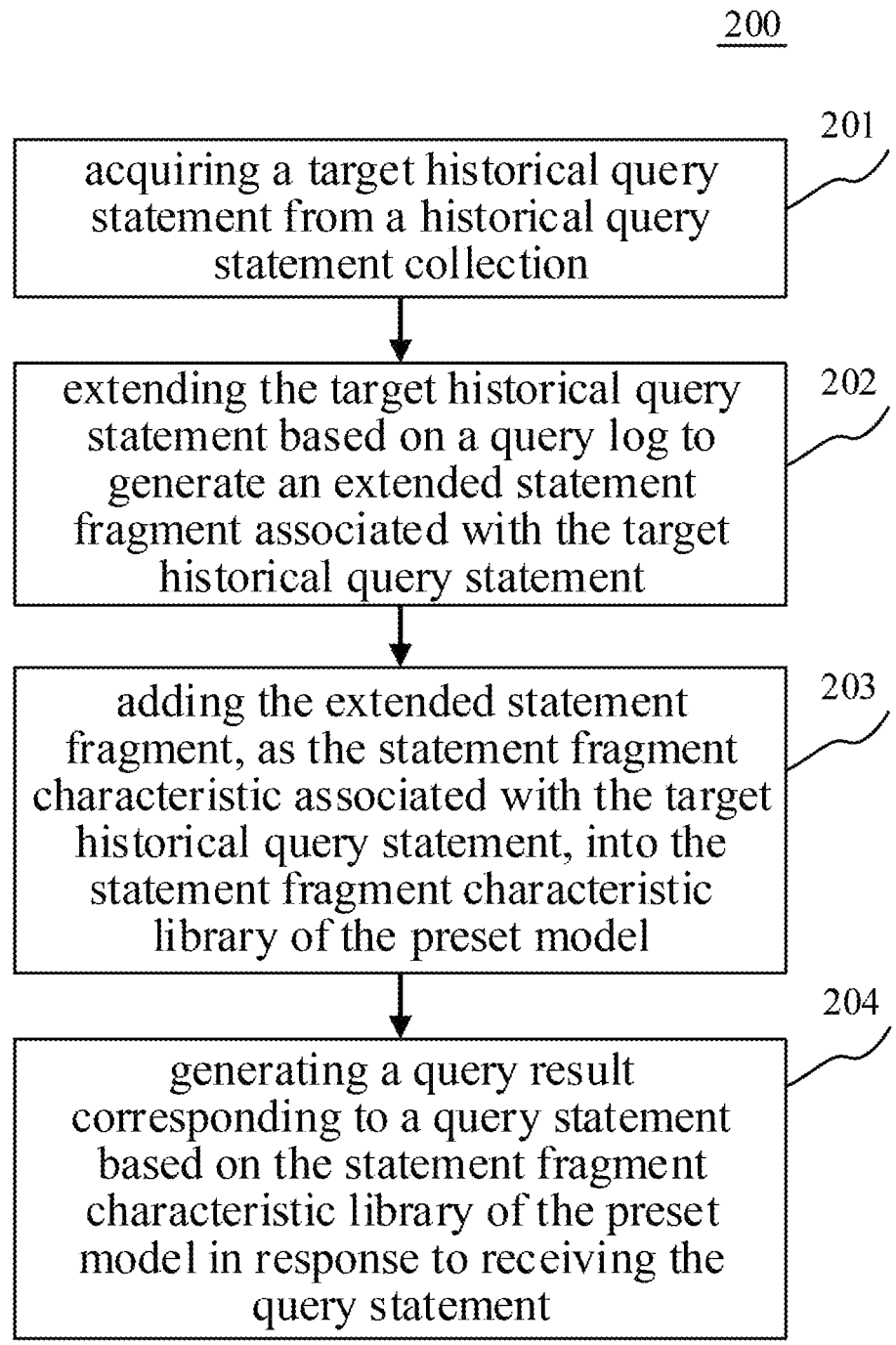
FIG. 2 is a flowchart of a query method according to an embodiment of the present disclosure.

Further referring to FIG. 2, a flow 200 of a query method according to an embodiment of the present disclosure is illustrated. The query method may comprise following steps.

In Step 201, a target historical query statement is acquired from a historical query statement collection.

In this embodiment, an electronic device (such as the server as shown in FIG. 1) on which the query method runs may acquire a target historical query statement from a designated historical query statement collection. The historical query statement collection here is a collection of some query statements queried by the user in the past. This collection may be a collection composed of one or more query statements queried within a designated historical period of time, or may be a collection generated by some artificially designated query statements. The target historical query statements are statements queried by the user in the past, which are set artificially or acquired (for example, acquiring latest query statements or acquiring the query statements earliest queried within the three months) according to a predesigned rule.

The query here may be a query performed using a network query engine, or may be a query performed on a designated query platform. If the query is the query performed on a designated query platform, the user performing the query is a product end user using the query platform to query.

In Step 202, the target historical query statement is extended based on a query log to generate an extended statement fragment associated with the target historical query statement.

In this embodiment, after acquiring the target historical query statement, the electronic device may extend the acquired target historical query statement based on the query log to generate the extended statement fragment. The generated extended statement fragment is associated with the target historical query statement. The query log is a log, comprising a query record, generated by querying by the user. To obtain more abundant data, the user recorded in the query log may be the user using the network query engine to query. Of course, the user here also may be the user designating the query platform. Extending refers to increasing statement fragments according to the target historical query statement to obtain more associated statement fragments. The statement fragments refer to characters, words, word groups, phrases, and so on, which are relatively flexible in character length. The generated extended statement fragment is one or more statement fragments, associated with the target historical query statement, which are obtained by extending the target historical query statement.

A variety of relationships may exist between the statement fragments associated with the target historical query statement and the target historical query statement. For example, inclusion, semantic similar or semantic contrary relationships, etc.

In Step 203, the extended statement fragment is added into the statement fragment characteristic library of the preset model, as the statement fragment characteristic associated with the target historical query statement.

In this embodiment, the electronic device determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

For example, a query statement "recommending a horror film" is inputted into the domain recognition model, and the domain of the query statement outputted by the model is "movie". If the query statement is inputted into the intent slot recognition model, the outputted query intent is "searching for a movie", and the limiting keyword is "horror".

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

By constructing the domain recognition model, the statement fragment characteristic library of the model may be pre-composed, and a corresponding relationship table between the statement fragment characteristics in the statement fragment characteristic library and the output of the domain recognition model is established. Next, the corresponding relationship table may be determined as the domain recognition model. The intent slot recognition model also may pre-compose the statement fragment characteristic library of the model, and a corresponding relationship table between the statement fragment characteristics and the output of the model is established. Next, the corresponding relationship table is determined as the intent slot recognition model.

The domain recognition model may be constructed in the following ways: first, the statement fragment is determined as a training sample to acquire a large number of statement fragments, then a query domain is labeled for the statement fragments, and then the labeled statement fragments are stored in the statement fragment characteristic library. Existing models for text similarity analysis such as a model of bag of words or a convolutional neural network (CNN) are trained using the statement fragment characteristics in the statement fragment characteristic library to obtain the domain recognition model.

The intent slot recognition model may be constructed in the following ways: the statement fragment is determined as a training sample to acquire a large number of statement fragments, then a query intent and a limiting keyword of the query intent are labeled for the statement fragments, and then the labeled statement fragments are stored in the statement fragment characteristic library. Existing analysis models such as a recurrent neural networks (RNN) and a deep neural network (DNN) are trained using the statement fragment characteristics in the statement fragment characteristic library to obtain the intent slot recognition model.

In some alternative implementations of this embodiment, in addition to obtaining the limiting keyword, the intent slot recognition model also may obtain a specific category to which the limiting keyword belongs. For example, the specific category of "horror" is a movie type. The specific category is associated with the domain and the query intent.

The preset model may comprise any one or two of the domain recognition model and the intent slot recognition model. Therefore, the statement fragment characteristic may be added into one or two of the above two models. The preset model may be a binary classification model. That is, it is determined whether a statement fragment belongs to the category of the model based on the statement fragment characteristic library of the model. Also the preset model may be a multi-classification model.

After extending the target historical query statement, a new statement fragment characteristic may be obtained, which may supplement the original statement fragment characteristic library. As a result, a query statement unrecognized by the original preset model can be recognized or can be recognized more accurately.

In Step 204, a query result corresponding to a query statement is generated based on the statement fragment characteristic library of the preset model in response to receiving the query statement.

In this embodiment, after receiving the query statement, the electronic device may generate the query result corresponding to the query statement based on the updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

Figure 3:
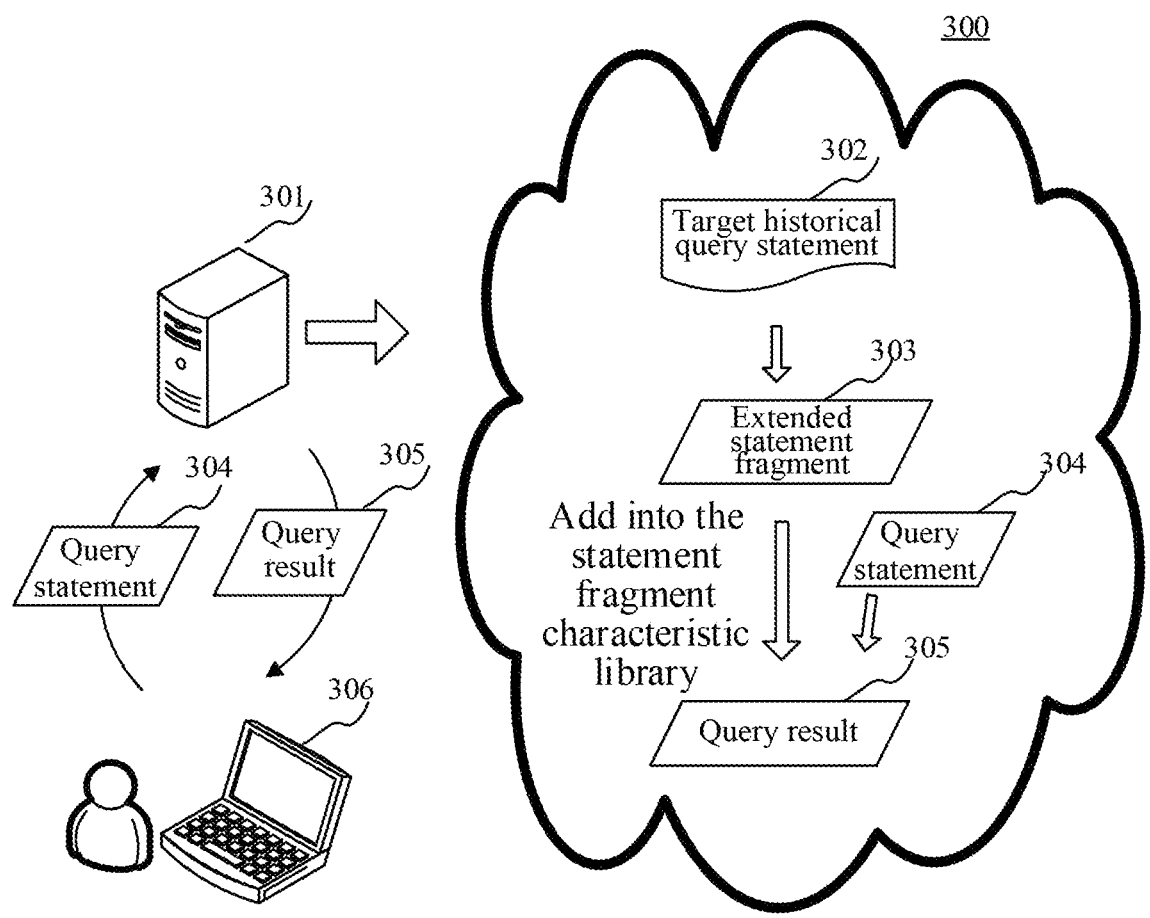
FIG. 3 is a schematic diagram of an application scenario of the query method according to the present disclosure.

Further referring to FIG. 3, a schematic diagram of an application scenario of the query method according to this embodiment is shown. In the application scenario of FIG. 3, a server acquires a target historical query statement "recommending a horror film" 302 from the historical query statement collection. Afterward, the server may extend the "recommending a horror film" based on a query log to generate an extended statement fragment "film" 303. Next, the server adds the "film", as a statement fragment characteristic associated with "recommending a horror film", into the statement fragment characteristic library of the domain recognition model and the statement fragment characteristic library of the intent slot recognition model. Finally, a user 306 queries, and the server obtains a query statement 304, generates a query result 305 using the updated statement fragment characteristic library of the domain recognition model and the statement fragment characteristic library of the intent slot recognition model, and pushes the query result 305 to the user 306.

According to the method provided by the embodiment of the present disclosure, a more accurate search result can be generated by adding the extended statement fragment, as the statement fragment characteristic associated with the target historical query statement, into the statement fragment characteristic library of the preset model.

Figure 4:
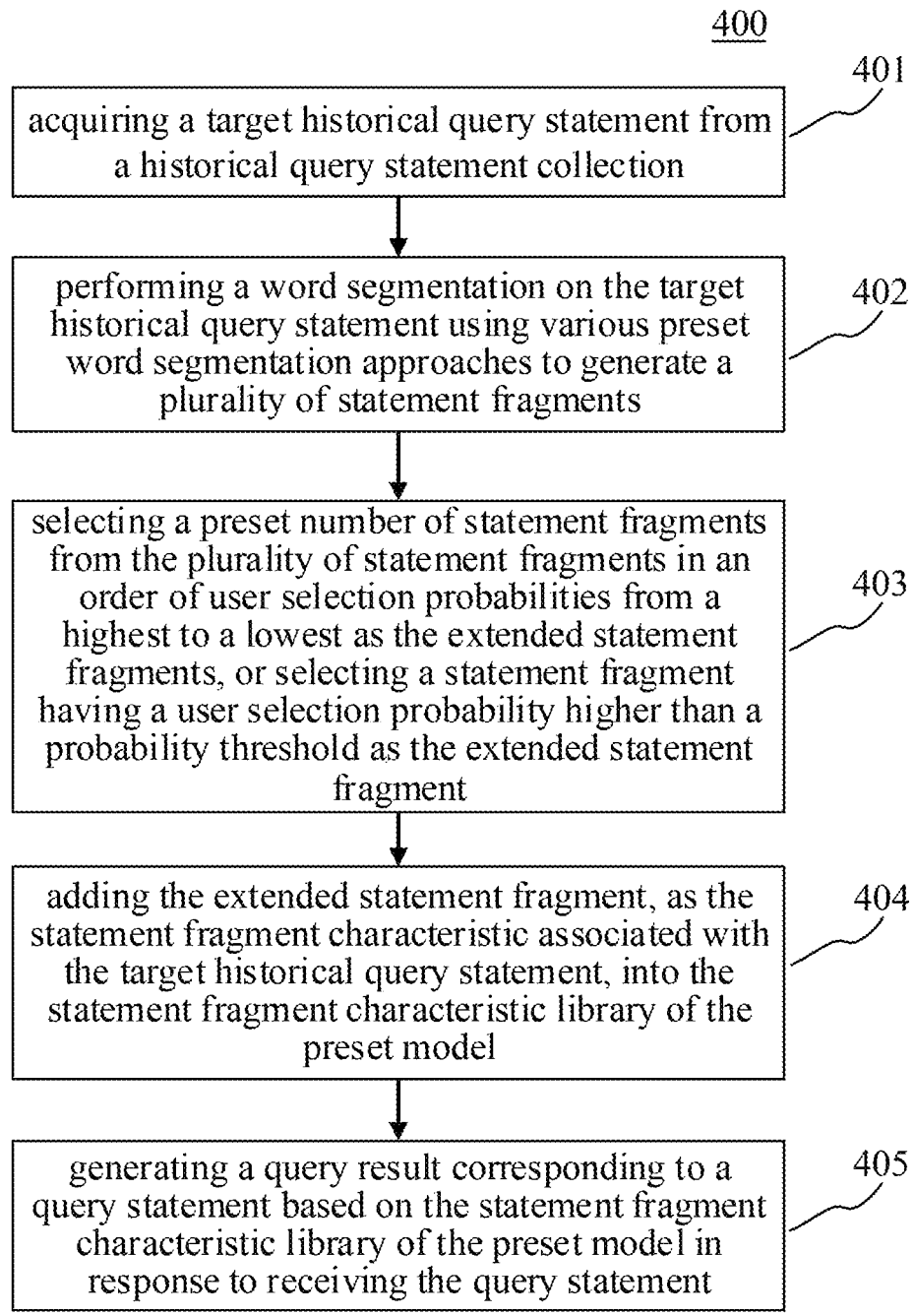
FIG. 4 is a flowchart of the query method according to another embodiment of the present disclosure.

Further referring to FIG. 4, a flow 400 of the query method according to still another embodiment is illustrated. The flow 400 of the query method comprises following steps.

In Step 401, a target historical query statement is acquired from a historical query statement collection.

In this embodiment, the server may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In Step 402, a word segmentation is performed on the target historical query statement using various preset word segmentation approaches to generate a plurality of statement fragments.

In this embodiment, the server performs word segmentation on the target historical query statement using various preset word segmentation approaches. Multiple groups of statement fragments are generated after word segmentation. Each group of statement fragments comprises a plurality of statement fragments. The word segmentation here refers to disassembling and decomposing a statement. Each word segmentation method may generate a plurality of statement fragments. A plurality of different statement fragments may be obtained using various word segmentation approaches. Granularities of the plurality of obtained statement fragments may be different. For example, if the query statement is "animated films to be released in coming days in Huaibei", "Huaibei" and "animated films to be released in coming days" may be obtained by word segmentation. Also, "Huaibei", "to be released in coming days" and "animated films" or the like may be obtained by word segmentation. The various preset word segmentation approaches may comprise a forward maximum matching method, a reverse maximum matching method, and bi-direction maximum matching method, etc.

In Step 403, a preset number of statement fragments are selected from the plurality of statement fragments in an order of user selection probabilities from a highest to a lowest as the extended statement fragments, or a statement fragment having a user selection probability higher than a probability threshold is selected as the extended statement fragment.

In this embodiment, the server determines, from the plurality of statement fragments, statement fragments that are selected by the user with higher probability. Specifically, a preset number of statement fragments may be selected, in order of user selection probabilities from high to low, as the extended statement fragments. The preset number may be one or more. In addition, a probability threshold may be preset, and a statement fragment among the plurality of statement fragments where the user selection probability is greater than the probability threshold is selected as the extended statement fragment. The user selection probability is determined by a number of historical clicks of each statement fragment among each group of statement fragments in the query result recorded in the query log, and the user selection probability refers to a probability of making a click selection of the query result corresponding to the statement fragment. The number of historical clicks is the number of times of making the click selection of the obtained query result when the user queries in the past taking a statement fragment as the query statement. The query result obtained by querying taking the statement fragment as the query statement may be a website of a plurality of web pages, namely a uniform resource locator (URL). Clicks on any URL in the query result may be accumulated based on the number of clicks.

The number of clicks on the query result after the user queries taking each statement fragment as the query statement may be recorded in the query log. The number of clicks on the query result may reflect the user's satisfaction with the query result. If the user clicks for many times or does not click on the query result, this indicates that the query result is not the user's ideal query result, and thus the user satisfaction is lower. Therefore, a value of the number of clicks may be preset. If the number of clicks on a statement fragment is closer to the preset value of the number of clicks, it is determined that the user selection probability of the statement fragment is high. Also there exists a corresponding relationship between the preset number of clicks and the user selection probability, so that the user selection probability is determined via the number of clicks according to the corresponding relationship. The server determines the user selection probability of each group of statement fragments, and determines the group of statement fragments with the highest selection probability as the extended statement fragments.

In Step 404, the extended statement fragment is added into the statement fragment characteristic library of the preset model, as the statement fragment characteristic associated with the target historical query statement.

In this embodiment, the server determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent.

For example, the query statement is "recommending a horror movie", the domain thereof is "movie", the query intent is "searching for a movie", and the limiting keyword is "horror". If the statement fragment characteristic "movie" is not present in the statement fragment characteristic library, the domain recognition model is unable to recognize the domain of the query statement. If the query statement is determined as the target historical query statement, the statement fragment characteristic "movie" may be obtained by way of word segmentation and by determining the user selection probability. If there is another query statement for searching the movie subsequently, the domain recognition model may recognize and obtain the domain "movie".

In Step 405, a query result corresponding to a query statement is generated based on the statement fragment characteristic library of the preset model in response to receiving the query statement.

In this embodiment, after receiving the query statement, the server may generate the query result corresponding to the query statement based on the updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

In this embodiment, data in the query log for clicking by the user are utilized, so that the characteristic in the statement fragment characteristic library can better satisfy the demands of the user while the statement fragment characteristic library is enriched.

Figure 5:
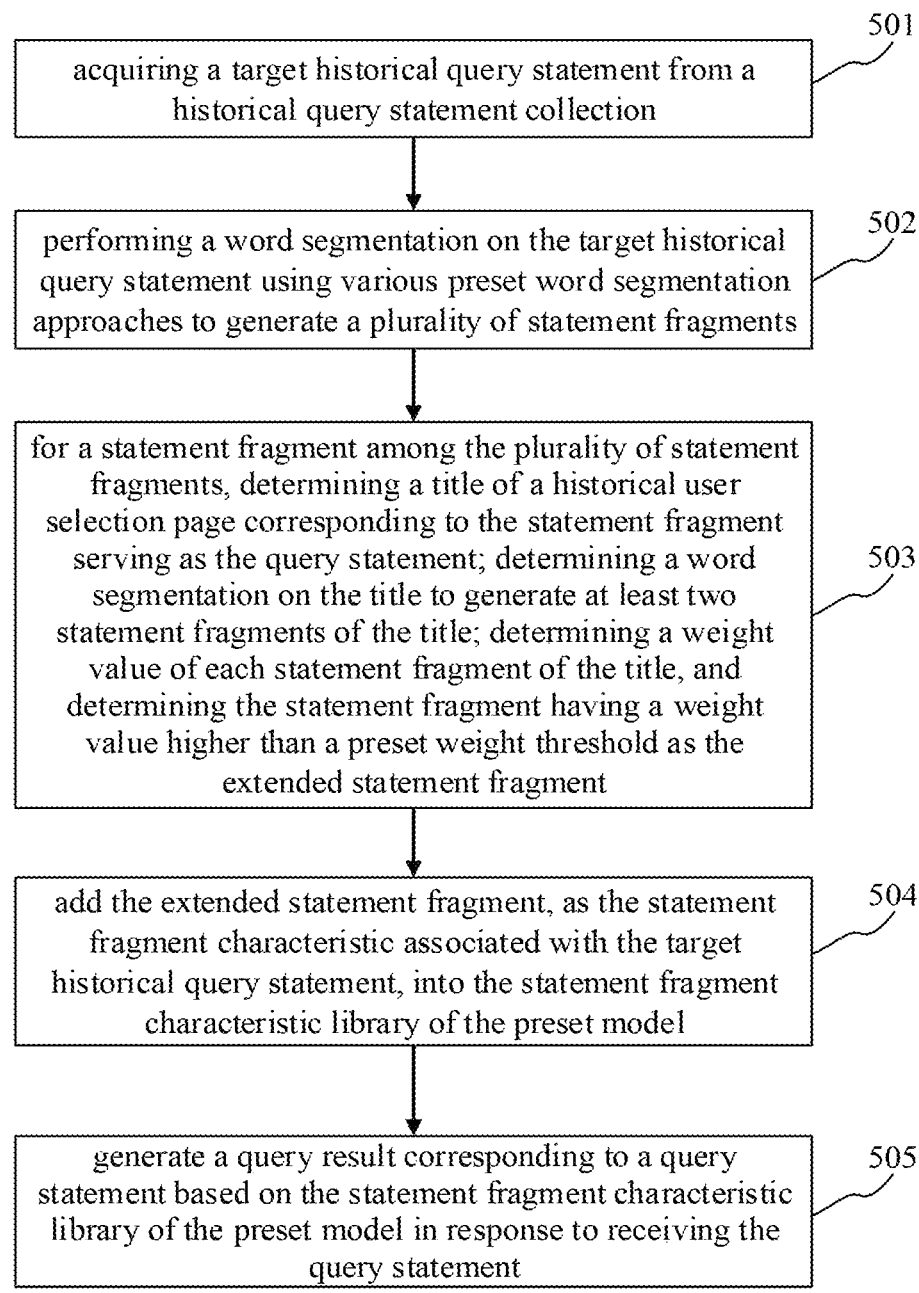
FIG. 5 is a flowchart of the query method according to still another embodiment of the present disclosure.

Further referring to FIG. 5, a flow 500 of the query method according to still another embodiment is illustrated. The flow 500 of the query method comprises following steps.

In Step 501, a target historical query statement is acquired from a historical query statement collection.

In this embodiment, the server may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In Step 502, a word segmentation is performed on the target historical query statement using various preset word segmentation approaches to generate a plurality of statement fragments.

In this embodiment, the server performs word segmentation on the target historical query statement using various preset word segmentation approaches. Multiple groups of statement fragments are generated after word segmentation. Each group of statement fragments comprises a plurality of statement fragments. The word segmentation here refers to disassembling and decomposing a statement. Each word segmentation method may generate a plurality of statement fragments. A plurality of different statement fragments may be obtained using various word segmentation approaches. The various preset word segmentation approaches may comprise a forward maximum matching method, a reverse maximum matching method, and bi-direction maximum matching method, etc.

For example, in Step 503, for a statement fragment among the plurality of statement fragments, a title of a historical user selection page corresponding to the statement fragment serving as the query statement is determined; a word segmentation is performed on the title to generate at least two statement fragments of the title; a weight value of each statement fragment of the title is determined and the statement fragment having a weight value higher than a preset weight threshold is determined as the extended statement fragment.

In this embodiment, Step 503 is decomposed into the following three sub-steps, namely, Sub-step S031, Sub-step S032, and Sub-step S033.

Sub-step S031: for a statement fragment among the plurality of statement fragments, determining a title of a historical user selection page corresponding to the statement fragment serving as the query statement.

In this embodiment, for a statement fragment among the plurality of statement fragments, the server determines the title of the page selected by the user from the query result after determining the statement fragment as a query statement in the past. The historical user selection page is a page corresponding to a URL selected from the query result after the user queries a certain statement fragment in the past.

Here, the target performing the operation may be one or more statement fragments among the plurality of statement fragments. There may be various methods for determining the statement fragment from the plurality of statement fragments. For example, a preset number of statement fragments is selected from the plurality of statement fragments in an order of user selection probabilities from a highest to a lowest, or a statement fragment having a user selection probability higher than a probability threshold is selected. The statement fragment also may be selected according to the time sequence of obtaining the statement fragment or may be randomly selected, etc.

Sub-step S032: performing a word segmentation on the title to generate at least two statement fragments of the title.

In this embodiment, the server may perform a word segmentation on the obtained title of the page using a certain preset word segmentation method. After performing a word segmentation on a title, the number of the generated statement fragments is at least two, and thus the obtained title corresponds to at least two statement fragments.

Sub-step S033: determining a weight value of each statement fragment of the title, and determining the statement fragment having a weight value higher than a preset weight threshold as the extended statement fragment.

In this embodiment, the server determines a weight value of each statement fragment among the at least two statement fragments of the title. The weight value of each statement fragment is compared with a preset weight threshold, and the statement fragment having a weight value higher than the preset weight threshold is determined as the extended statement fragment. The weight value of the statement fragment may be set using various methods, for example, using term frequency-inverse document frequency (TF-IDF).

In Step 504, the extended statement fragment is added into the statement fragment characteristic library of the preset model, as the statement fragment characteristic associated with the target historical query statement.

In this embodiment, the server determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent. For example, the query statement is "recommending a horror film", the domain thereof is "movie", the query intent is "searching for a movie", and the limiting keyword is "horror".

In Step 505, a query result corresponding to a query statement is generated based on the statement fragment characteristic library of the preset model in response to receiving the query statement.

In this embodiment, after receiving the query statement, the server may generate the query result corresponding to the query statement based on the updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

In this embodiment, the title of the historical user selection page is utilized, the characteristic in the statement fragment characteristic library is extended, and the output of the preset model is more accurate.

Figure 6:
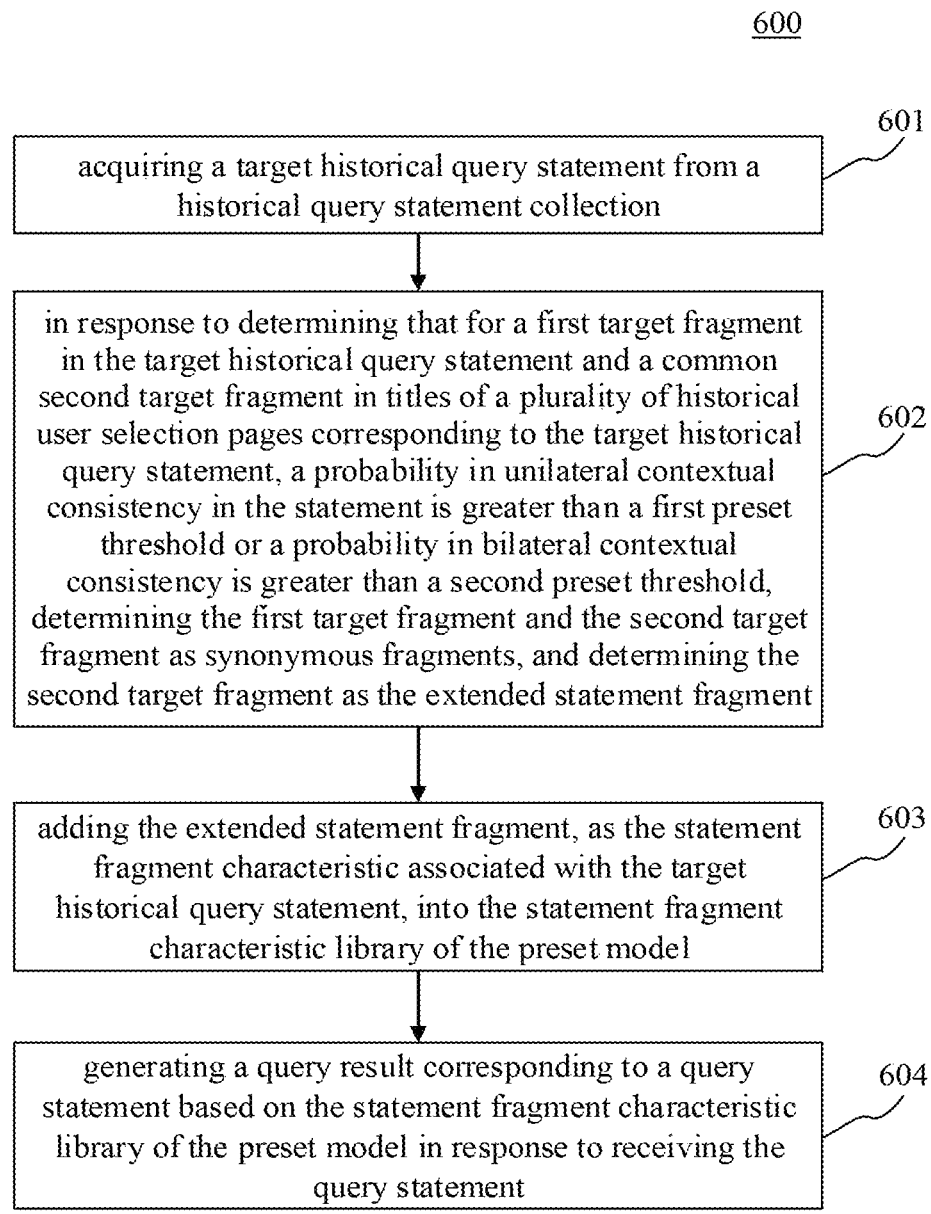
FIG. 6 is a flowchart of the query method according to still another embodiment of the present disclosure.

Further referring to FIG. 6, a flow 600 of the query method according to still another embodiment is illustrated. The flow 600 of the query method comprises following steps.

In Step 601, a target historical query statement is acquired from a historical query statement collection.

In this embodiment, the server may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In Step 602, in response to determining that for a first target fragment in the target historical query statement and a common second target fragment in titles of a plurality of historical user selection pages corresponding to the target historical query statement, a probability in unilateral contextual consistency in the statement is greater than a first preset threshold or a probability in bilateral contextual consistency is greater than a second preset threshold, the first target fragment and the second target fragment are determined as synonymous fragments, and the second target fragment is determined as the extended statement fragment.

In this embodiment, the first target fragment is present in the target historical query statement, and also the second target fragment common to a plurality of titles is present in the titles of a plurality of historical user selection pages corresponding to the target historical query statement. The historical user selection pages are recorded in the query log by the record selected by the user. The server may compare a certain query statement entered by the user into the query log with a plurality of titles, and make a response if two statement fragments high in contextual similarity are present: determining the two statement fragments as synonymous fragments. Here, the first target fragment is a statement fragment in the target historical query statement, and the second target fragment is a statement fragment in the title of the page selected by the user.

Specifically, a statement fragment is in a statement, and the statement fragment has bilateral contexts (start of the statement and end of the statement) when the statement fragment is in the middle position of the statement. The query statements are compared with each title, and the ratio of the number of unilateral contextual consistent query statements to the total number of query statements participating in comparison is determined as the probability in unilateral contextual consistency. Correspondingly, the ratio of the number of bilateral contextual consistent query statements to the total number of query statements participating in comparison is determined as the probability in bilateral contextual consistency. Both the first preset threshold and the second preset threshold are thresholds preset for the contextually-consistent probability. The obtained probability in unilateral contextual consistency and the probability in bilateral contextual consistency may be respectively compared with the two thresholds to determine magnitude of the obtained probability. The query statements may be determined as synonymous fragments if the probability is higher.

The server determines the second target fragment as the extended statement fragment when both the first target fragment and the second target fragment are determined as the synonymous fragments.

In some alternative implementations of this embodiment, the query statements are determined as the extended statement fragments. In this way, two synonymous statement fragments may be added into the statement fragment characteristic library so that resources in the statement fragment characteristic library are more abundant.

In Step 603, the extended statement fragment is added into the statement fragment characteristic library of the preset model, as the statement fragment characteristic associated with the target historical query statement.

In this embodiment, the server determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent. For example, the query statement is "recommending a horror film", the domain thereof is "movie", the query intent is "searching for a movie", and the limiting keyword is "horror".

In Step 604, a query result corresponding to a query statement is generated based on the statement fragment characteristic library of the preset model in response to receiving the query statement.

In this embodiment, after receiving the query statement, the server may generate the query result corresponding to the query statement based on the updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

In this embodiment, it is determined whether two statement fragments are synonymous fragments according to context. In this way, the statement fragment characteristic library can be further enriched, and the output of the preset model is more accurate.

Figure 7:
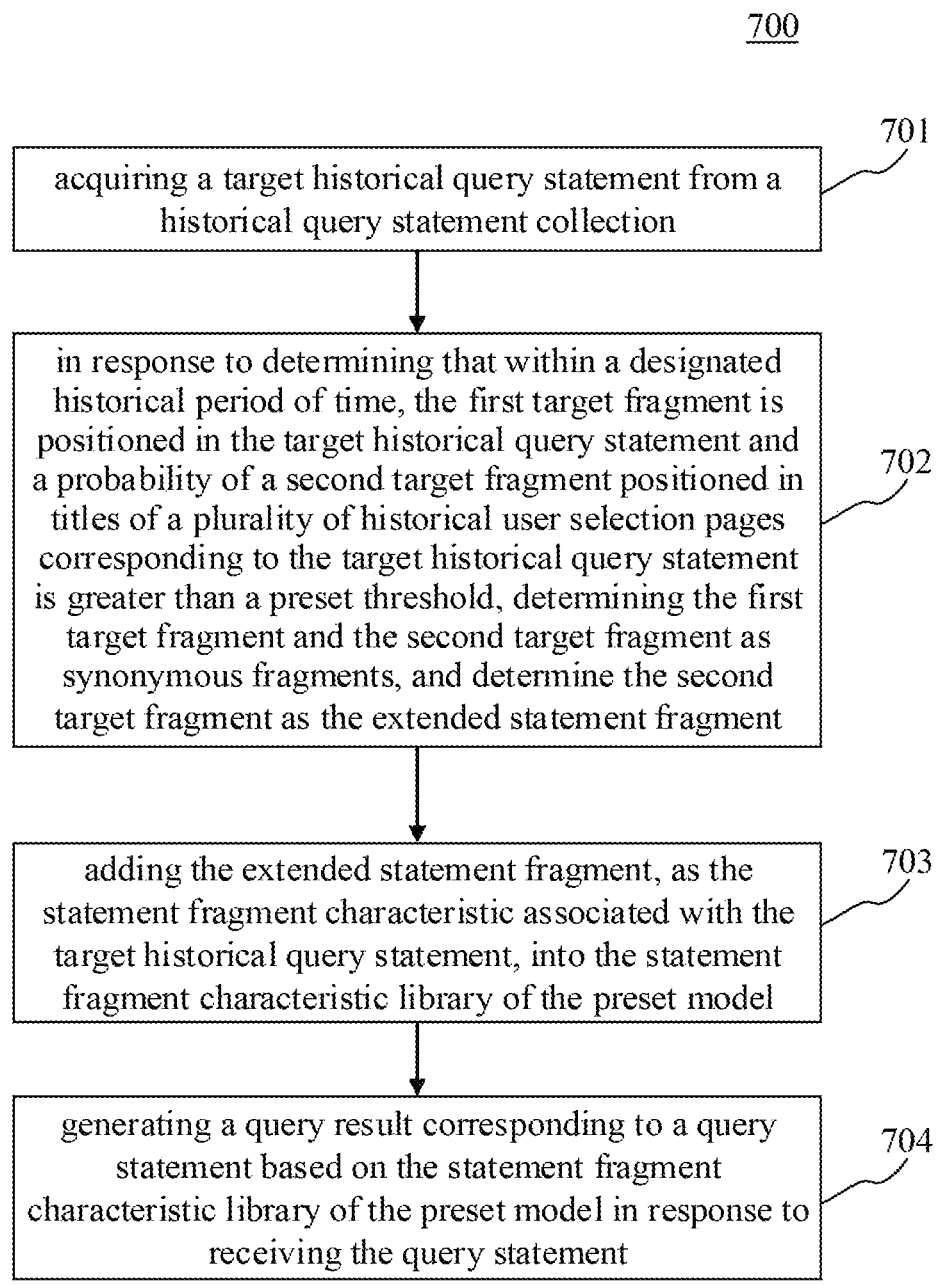
FIG. 7 is a flowchart of the query method according to still another embodiment of the present disclosure.

Further referring to FIG. 7, a flow 700 of the query method according to still another embodiment is illustrated. The flow 700 of the query method comprises following steps.

In Step 701, a target historical query statement is acquired from a historical query statement collection.

In this embodiment, the server may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In Step 702, in response to determining that within a designated historical period of time, the first target fragment is positioned in the target historical query statement and a probability of a second target fragment positioned in titles of a plurality of historical user selection pages corresponding to the target historical query statement is greater than a preset threshold, the first target fragment and the second target fragment are determined as synonymous fragments, and the second target fragment is determined as the extended statement fragment.

In this embodiment, in response to determining within a designated historical period of time, the first target fragment is positioned in the target historical query statement, and the second target fragment is positioned in titles of a plurality of historical user selection pages corresponding to the target historical query statement. The probability refers to a ratio of the number of times of presence of the first target fragment in the target historical query statement and the number of times of presence of the second target fragment in the title of the user selection page to the total number of queries performed using the target historical query statement. A record selected for the historical user selection page is recorded into the query log.

If the obtained probability is greater than the preset threshold, two statement fragments are present in the target historical query statement and the titles of the plurality of pages corresponding to the target historical query statement with a high frequency. In this way, both the first target fragment and the second target fragment may be determined as synonymous fragments.

The server determines the second target fragment as the extended statement fragment when both the first target fragment and the second target fragment are determined as the synonymous fragments.

In some alternative implementations of this embodiment, the query statements are determined as the extended statement fragments. In this way, two synonymous statement fragments may be added into the statement fragment characteristic library so that resources in the statement fragment characteristic library are more abundant.

In Step 703, the extended statement fragment is added into the statement fragment characteristic library of the preset model, as the statement fragment characteristic associated with the target historical query statement.

In this embodiment, the server determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent. For example, the query statement is "recommending a horror film", the domain thereof is "movie", the query intent is "searching for a movie", and the limiting keyword is "horror".

In Step 704, a query result corresponding to a query statement is generated based on the statement fragment characteristic library of the preset model in response to receiving the query statement.

In this embodiment, after receiving the query statement, the server may generate the query result corresponding to the query statement based on the updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

In this way, the statement fragment characteristic library can be further enriched, and the output of the preset model is more accurate.

Figure 8:
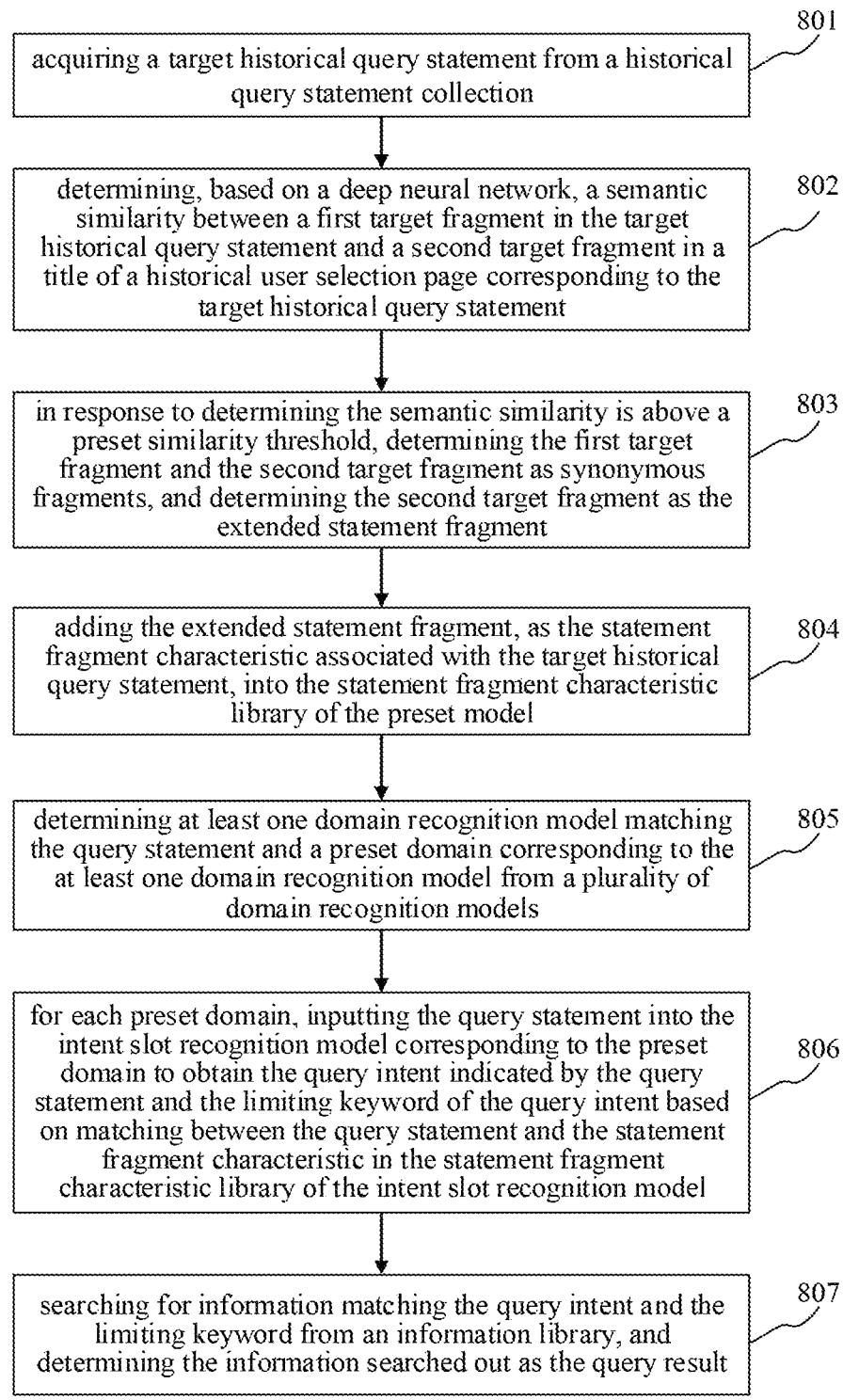
FIG. 8 is a flowchart of the query method according to still another embodiment of the present disclosure.

Further referring to FIG. 8, a flow 800 of the query method according to still another embodiment is illustrated. The flow 800 of the query method comprises following steps.

In Step 801, a target historical query statement is acquired from a historical query statement collection.

In this embodiment, the server may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In Step 802, a semantic similarity between a first target fragment in the target historical query statement and a second target fragment in a title of a historical user selection page corresponding to the target historical query statement is determined based on a deep neural network.

In this embodiment, the server determines the semantic similarity between the first target fragment and the second target fragment using the deep neural network. The deep neural network may be configured to characterize the corresponding relationship between two statement fragments and the semantic similarity between the two statement fragments. The first target fragment is a statement fragment in the target historical query statement, and the second target fragment is a statement fragment in the title of the user selection page. A record selected for the historical user selection page is recorded into the query log.

In Step 803, in response to determining the semantic similarity is above a preset similarity threshold, the first target fragment and the second target fragment are determined as synonymous fragments, and the second target fragment is determined as the extended statement fragment.

In this embodiment, the similarity threshold may be preset, and if the obtained semantic similarity is greater than or equal to the preset similarity threshold, both the first target fragment and the second target fragment are determined as synonymous fragments. The server determines the second target fragment as the extended statement fragment when both the first target fragment and the second target fragment are determined as the synonymous fragments.

In some alternative implementations of this embodiment, the query statements are determined as the extended statement fragments. In this way, two synonymous statement fragments may be added into the statement fragment characteristic library so that resources in the statement fragment characteristic library are more abundant.

In Step 804, the extended statement fragment is added into the statement fragment characteristic library of the preset model as the statement fragment characteristic associated with the target historical query statement.

In this embodiment, the server determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent. For example, the query statement is "recommending a horror film", the domain thereof is "movie", the query intent is "searching for a movie", and the limiting keyword is "horror".

In Step 805, in response to the preset model comprising the domain recognition model and the intent slot recognition model, at least one domain recognition model matching the query statement and a preset domain corresponding to the at least one domain recognition model are determined from a plurality of domain recognition models based on the statement fragment characteristic library of each one of the plurality of domain recognition models.

In this embodiment, in response to the preset model comprising the domain recognition model and the intent slot recognition model, the server determines at least one domain recognition model matching the query statement and a preset domain corresponding to the at least one domain recognition model from a plurality of domain recognition models according to the statement fragment characteristic library of each one of the plurality of domain recognition models. One query statement may match a plurality of domains.

In some alternative implementations of this embodiment, the domain recognition model also outputs a confidence coefficient of a domain while outputting the domain indicated by the query statement. When the confidence coefficient is lower, to-be-confirmed information may be transmitted to a client, so that the user determines whether the outputted domain is correct or labels the domain. Afterwards, the server may determine whether the domain is correct according to determined correct information or determined error information returned by the client. The accuracy of determining the domain may be increased via feedback from the user.

In Step 806, for each preset domain, the query statement is inputted into the intent slot recognition model corresponding to the preset domain to obtain the query intent indicated by the query statement and the limiting keyword of the query intent based on matching between the query statement and the statement fragment characteristic in the statement fragment characteristic library of the intent slot recognition model.

In this embodiment, for each preset domain among the determined at least one domain, the server inputs the query statement into the intent slot recognition model corresponding to the preset domain. Each preset domain (or preset domain model) has a corresponding intent slot recognition model. In the event that the preset domain is determined, the query intent and the limiting keyword may be determined according to the preset domain. The query statement is matched with the statement fragment in the statement fragment characteristic library of the intent slot recognition model. If a matched statement fragment characteristic is searched out, the limiting keyword corresponding to the statement fragment characteristic is outputted.

In some alternative implementations of this embodiment, when outputting the query intent indicated by the query statement and the limiting keyword of the query intent, the intent slot recognition model also outputs confidence coefficients of the query intent and of the limiting keyword. When the confidence coefficients are lower, to-be-confirmed information may be transmitted to the client, so that the user determines whether the outputted query intent and the limiting keyword are correct or labels the same. Afterwards, the server may determine whether the query intent and the limiting keyword are correct according to determined correct information or determined error information returned by the client. The accuracy of determining the query intent and the limiting keyword may be increased via feedback from the user.

In Step 807, information matching the query intent and the limiting keyword is searched from an information library, and the information searched out is determined as the query result.

In this embodiment, the server searches for information matching the query intent and the limiting keyword from the information library. Next, the information searched out is determined as the query result.

In this way, the statement fragment characteristic library can be further enriched, and the output of the preset model is more accurate.

Figure 9:
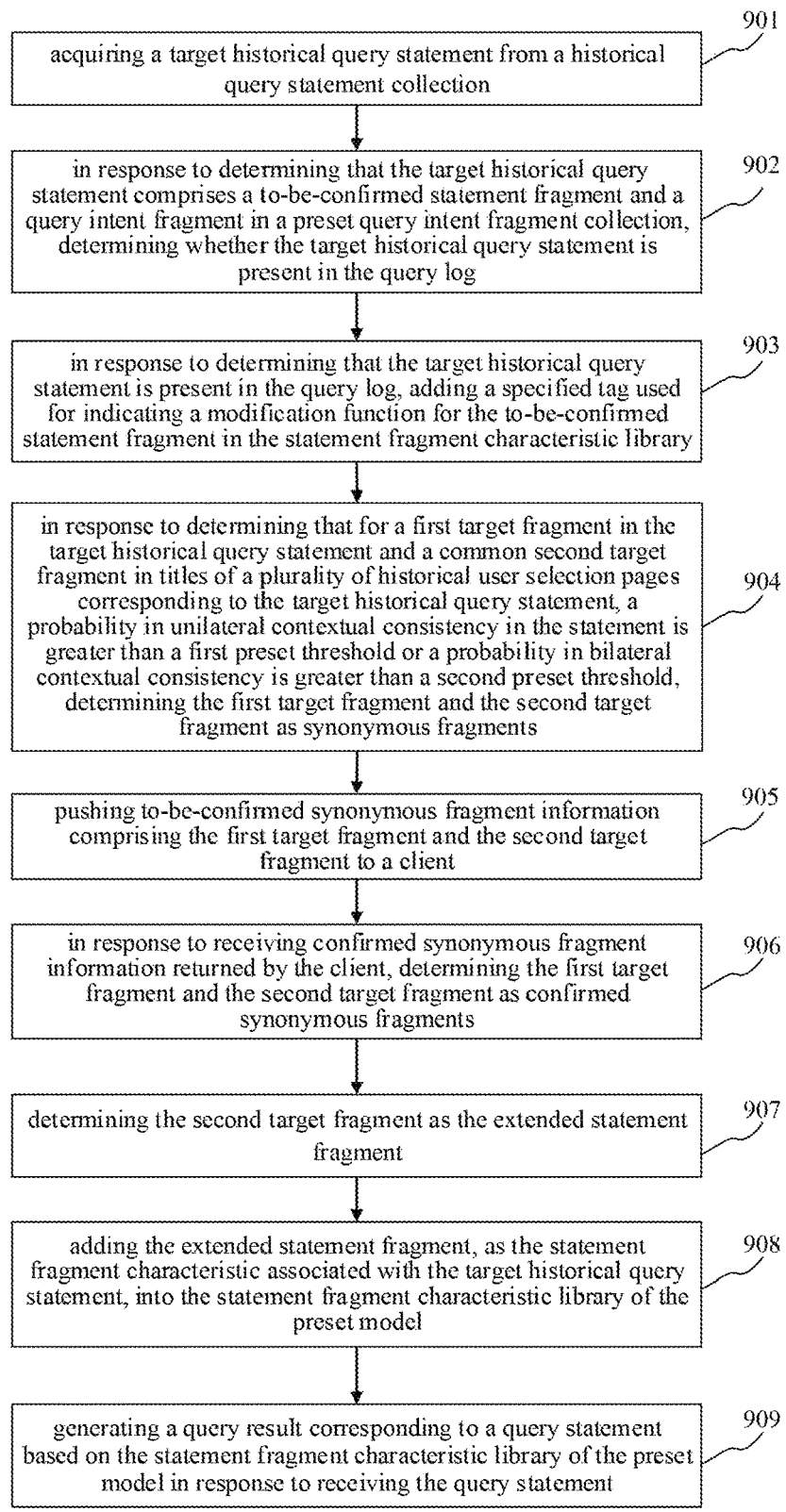
FIG. 9 is a flowchart of the query method according to still another embodiment of the present disclosure.

Further referring to FIG. 9, a flow 900 of the query method according to still another embodiment is illustrated. The flow 900 of the query method comprises following steps.

In Step 901, a target historical query statement is acquired from a historical query statement collection.

In this embodiment, the server may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In Step 902, in response to determining that the target historical query statement comprises a to-be-confirmed statement fragment and a query intent fragment in a preset query intent fragment collection, whether the target historical query statement is present in the query log is determined.

In this embodiment, in response to determining that the target historical query statement comprises a to-be-confirmed statement fragment and a query intent fragment, the server searches for the target historical query statement from the query log to determine whether the target historical query statement is present in the query log. The query intent fragment here refers to the statement fragment of the query intent, which is comprised in the preset query intent fragment collection.

In Step 903, in response to determining that the target historical query statement is present in the query log, a specified tag used for indicating a modification function is added for the to-be-confirmed statement fragment in the statement fragment characteristic library.

In this embodiment, in response to determining that the target historical query statement is present in the query log, the server adds the specified tag for the to-be-confirmed statement fragment in the statement fragment characteristic library. The specified tag is used for indicating that the to-be-confirmed statement fragment is a modifying statement fragment. That is, in the target historical query statement, the to-be-confirmed statement fragment is a statement fragment for modifying the query intent fragment. After the specified tag is added, the statement fragment characteristic library has more abundant statement fragment characteristics. The preset model with the statement fragment characteristic library updated can more accurately output.

In Step 904, in response to determining that for a first target fragment in the target historical query statement and a common second target fragment in titles of a plurality of historical user selection pages corresponding to the target historical query statement, a probability in unilateral contextual consistency in the statement is greater than a first preset threshold or a probability in bilateral contextual consistency is greater than a second preset threshold, the first target fragment and the second target fragment are determined as synonymous fragments.

In this embodiment, the first target fragment is present in the target historical query statement, and also the second target fragment common to a plurality of titles is present in the titles of a plurality of historical user selection pages corresponding to the target historical query statement. The historical user selection pages are recorded in the query log by the record selected by the user. In the event that the statement fragment characteristic library is updated, the server may compare a certain query statement entered by the user into the query log with a plurality of titles, and make a response if two statement fragments high in contextual similarity are present: determining the two statement fragments as synonymous fragments. Here, the first target fragment is a statement fragment in the target historical query statement, and the second target fragment is a statement fragment in the title of the page selected by the user.

In Step 905, to-be-confirmed synonymous fragment information comprising the first target fragment and the second target fragment is pushed to a client.

In this embodiment, to further determine whether the first target fragment and the second target fragment are synonyms, the server pushes the to-be-confirmed synonymous fragment information comprising the two target fragments to the client so that the user determines whether the two statement fragments are synonymous. The to-be-confirmed synonymous fragment information is information for determining by the user whether the two statement fragments are synonymous.

In Step 906, in response to receiving confirmed synonymous fragment information returned by the client, the first target fragment and the second target fragment are determined as confirmed synonymous fragments.

In this embodiment, in response to receiving confirmed synonymous fragment information returned by the client according to the to-be-confirmed information, the server further determines the first target fragment and the second target fragment are synonymous. The to-be-confirmed synonymous fragment information is used for indicating that the user determines the first target fragment and the second target fragment in the to-be-confirmed information as synonymous fragments. In this way, both the first target fragment and the second target fragment are determined as confirmed synonymous fragments. The confirmed synonymous fragments are (two) statement fragments determined to be synonymous by the user.

In Step 907, the second target fragment is determined as the extended statement fragment.

In this embodiment, in response to determining the first target fragment and the second target fragment as confirmed synonymous fragments, the server determines the second target fragment as the extended statement fragment.

In some alternative implementations of this embodiment, the query statements are determined as the extended statement fragments. In this way, two synonymous statement fragments may be added into the statement fragment characteristic library so that resources in the statement fragment characteristic library are more abundant.

In Step 908, the extended statement fragment is added into the statement fragment characteristic library of the preset model as the statement fragment characteristic associated with the target historical query statement.

In this embodiment, the server determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

The statement fragment characteristic library is a database adopted by a preset model. A large number of statement fragment characteristics are stored in the database. The statement fragment characteristics may be various statement fragments such as characters, words, word groups, phrases, and so on, which are used to compare and recognize the query statements to learn about the semantic meaning of the query statements. A query statement is inputted into the preset model, the query statement is matched to a statement fragment characteristic with the most approximate semantic meaning, and then output of the preset model is obtained.

The semantic meaning of the query statement refers to the language meaning of the query statement. The preset domain refers to a broad category to which the preset information belongs. The query intent is a direct query objective of the user, namely, what the user wants to obtain by querying. The query intent embodies what operation is to be performed by the query statement and the core content to be obtained for the operation. The limiting keyword (i.e., slot position) is a word or statement fragment for modifying and limiting the query intent. The demands of the user may be further refined and expressed on the basis of the query intent. For example, the query statement is "recommending a horror film", the domain thereof is "movie", the query intent is "searching for a movie", and the limiting keyword is "horror".

In Step 909, a query result corresponding to a query statement is generated based on the statement fragment characteristic library of the preset model in response to receiving the query statement.

In this embodiment, after receiving the query statement, the server may generate the query result corresponding to the query statement based on the further updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

In this embodiment, by adding a tag, a modifying fragment can be accurately and quickly determined. Furthermore, by pushing the to-be-confirmed synonymous fragment information to the user to obtain the user's judgment of whether the statement fragments are synonymous, it can be determined whether the statement fragments are synonymous. Therefore, capability of recognition of the query statement is enhanced, and accuracy of model output is increased.

Figure 10:
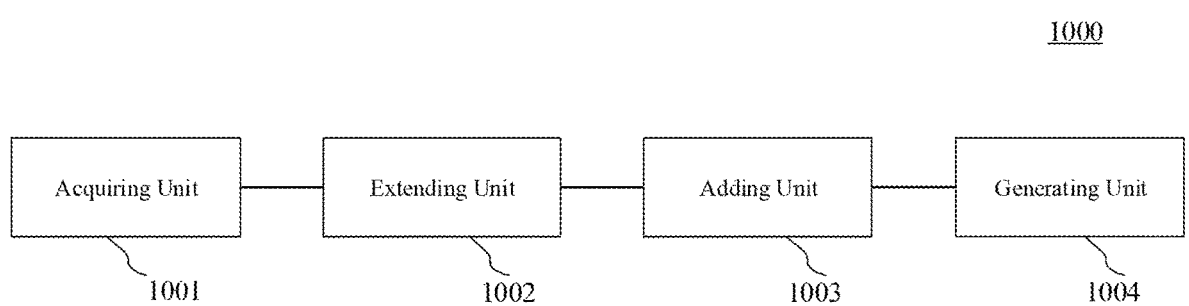
FIG. 10 is a schematic structural diagram of a query apparatus according to an embodiment of the present disclosure.

Further referring to FIG. 10, as an implementation of the method as shown in the foregoing figures, the present disclosure provides an embodiment of a query apparatus. The apparatus embodiment corresponds to the method embodiment as shown in FIG. 2, and the apparatus specifically may be used in various electronic devices.

As shown in FIG. 10, the query apparatus 1000 in this embodiment comprises: an acquiring unit 1001, an extending unit 1002, an adding unit 1003, and a generating unit 1004. The acquiring unit 1001 is configured to acquire a target historical query statement from a historical query statement collection. The extending unit 1002 is configured to extend the target historical query statement based on a query log to generate an extended statement fragment associated with the target historical query statement. The adding unit 1003 is configured to add the extended statement fragment, as a statement fragment characteristic associated with the target historical query statement, into a statement fragment characteristic library of a preset model. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement and a limiting keyword of the, and a corresponding relationship between a query statement query intent. The generating unit 1004 is configured to generate a query result corresponding to a query statement based on the statement fragment characteristic library of the preset model in response to receiving the query statement.

In this embodiment, the acquiring unit 1001 may acquire a target historical query statement from a designated historical query statement collection. The historical query statement collection here is a collection of some query statements queried by the user in the past. This collection may be a collection composed of one or more query statements queried within a designated historical period of time, or may be a collection composed of some artificially designated query statements. The target historical query statements are statements queried by the user in the past, which are set artificially or acquired according to a predesigned rule.

In this embodiment, the extending unit 1002 may extend, after acquiring the target historical query statement, the acquired target historical query statement based on a query log to generate an extended statement fragment. The generated extended statement fragment is associated with the target historical query statement. The query log is a log, comprising a query record, generated by querying by the user. To obtain more abundant data, the user recorded in the query log may be the user using the network query engine to query. Of course, the user here also may be the user designating the query platform. Extending refers to increasing statement fragments according to the target historical query statement to obtain more associated statement fragments. The statement fragments refer to characters, words, word groups, phrases, and so on, which are relatively flexible in character length. The number of the obtained extended statement fragments may be one or more.

In this embodiment, the adding unit 1003 determines the obtained extended statement fragment as the statement fragment characteristic associated with the target historical query statement, and adds the statement fragment characteristic into the statement fragment characteristic library. The preset model comprises a domain recognition model and/or an intent slot recognition model, wherein the domain recognition model is configured to characterize a corresponding relationship between a query statement and a preset domain, a semantic meaning of the query statement belonging to the preset domain, and the intent slot recognition model is configured to characterize a corresponding relationship between a query statement and a query intent indicated by the query statement, and a corresponding relationship between a query statement and a limiting keyword of the query intent. By inputting the query statement into the intent slot recognition model, a query intent and a limiting keyword of the query intent may be outputted.

In this embodiment, after receiving the query statement, the generating unit 1004 may generate the query result corresponding to the query statement based on the updated statement fragment characteristic library of the preset model. Specifically, the statement fragment characteristic corresponding to the query statement may be searched from the statement fragment characteristic library, and then a domain as well as a query intent and a limiting keyword associated with the domain may be outputted. Alternatively, only the domain is outputted, or only the query intent and the limiting keyword are outputted. Information matching the output is searched from an information library according to the output, and the information searched out is determined as the query result.

In some alternative implementations of this embodiment, the extending unit comprises: a word segmenting module (not shown), configured to perform a word segmentation on the target historical query statement using various preset word segmentation approaches to generate a plurality of statement fragments; and a determining module (not shown), configured to select a preset number of statement fragments from the plurality of statement fragments in an order of user selection probabilities from a highest to a lowest as the extended statement fragments, or select a statement fragment having a user selection probability higher than a probability threshold as the extended statement fragment. The user selection probability is determined by a number of historical clicks of each statement fragment among each group of statement fragments in the query result recorded in the query log.

In some alternative implementations of this embodiment, the extending unit comprises: a generating module (not shown), configured to perform a word segmentation on the target historical query statement using various preset word segmentation approaches to generate a plurality of statement fragments; and a statement fragment generating module (not shown), configured to determine, for a statement fragment among the plurality of statement fragments, a title of a historical user selection page corresponding to the statement fragment serving as the query statement; perform a word segmentation on the title to generate at least two statement fragments of the title; and determine a weight value of each statement fragment of the title, and determine the statement fragment having a weight value higher than a preset weight threshold as the extended statement fragment.

In some alternative implementations of this embodiment, the extending unit comprises: a synonym determining module (not shown), configured to determine, in response to determining that for a first target fragment in the target historical query statement and a second target fragment in a title of a historical user selection page corresponding to the target historical query statement, a probability in unilateral contextual consistency in the statement is greater than a first preset threshold or a probability in bilateral contextual consistency is greater than a second preset threshold, the first target fragment and the second target fragment as synonymous fragments, wherein a record selected for the historical user selection page is recorded into the query log; and an extended statement fragment determining module (not shown), configured to determine the second target fragment as the extended statement fragment.

In some alternative implementations of this embodiment, the extending unit is further configured to: in response to determining that within a designated historical period of time, the first target fragment is positioned in the target historical query statement and a probability of a second target fragment positioned in titles of a plurality of historical user selection pages corresponding to the target historical query statement is greater than a preset threshold, determine the first target fragment and the second target fragment as synonymous fragments, wherein a record selected for the historical user selection page is recorded into the query log; and determine the second target fragment as the extended statement fragment.

In some alternative implementations of this embodiment, the extending unit comprises: a similarity determining module (not shown), configured to determine, based on a deep neural network, a semantic similarity between a first target fragment in the target historical query statement and a second target fragment in a title of a historical user selection page corresponding to the target historical query statement, a record selected for the historical user selection page being recorded into the query log; a synonymous fragment determining module (not shown), configured to determine, in response to determining the semantic similarity is above a preset similarity threshold, the first target fragment and the second target fragment as synonymous fragments; and a statement fragment extending module (not shown), configured to determine the second target fragment as the extended statement fragment.

In some alternative implementations of this embodiment, the extending unit further comprises: a pushing module (not shown), configured to push to-be-confirmed synonymous fragment information comprising the first target fragment and the second target fragment to a client; and a synonym determining module (not shown), configured to determine, in response to receiving confirmed synonymous fragment information returned by the client, the first target fragment and the second target fragment as confirmed synonymous fragments.

In some alternative implementations of this embodiment, the apparatus is further configured to: in response to determining that the target historical query statement comprises a to-be-confirmed statement fragment and a query intent fragment in a preset query intent fragment collection, determine whether the target historical query statement is present in the query log; and in response to determining that the target historical query statement is present in the query log, add a specified tag used for indicating a modification function for the to-be-confirmed statement fragment in the statement fragment characteristic library.

In some alternative implementations of this embodiment, the generating unit is further configured to: in response to the preset model comprising the domain recognition model and the intent slot recognition model, determine at least one domain recognition model matching the query statement and a preset domain corresponding to the at least one domain recognition model from a plurality of domain recognition models according to the statement fragment characteristic library of each one of the plurality of domain recognition models; for each preset domain, input the query statement into the intent slot recognition model corresponding to the preset domain to obtain the query intent indicated by the query statement and the limiting keyword of the query intent based on matching between the query statement and the statement fragment characteristic in the statement fragment characteristic library of the intent slot recognition model; and search for information matching the query intent and the limiting keyword from an information library, and determine the information searched out as the query result.

Figure 11:
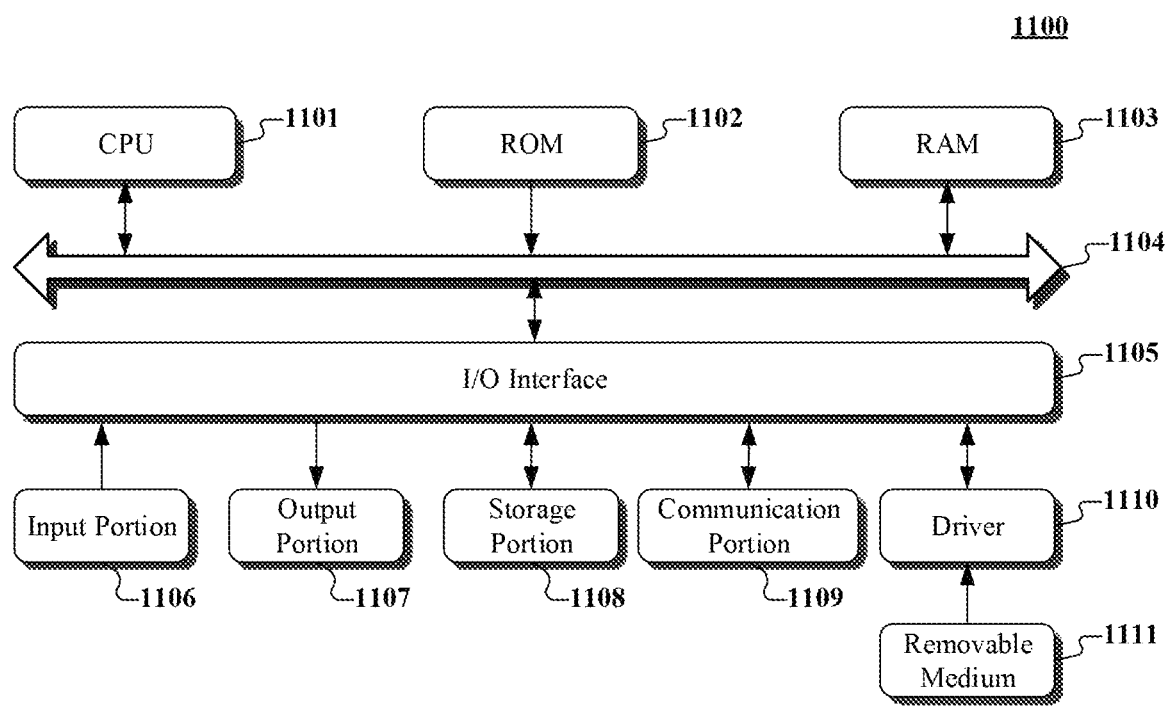
FIG. 11 illustrates a structural schematic diagram of a computer system adapted to implement a server of the embodiments of the present disclosure.

Referring to FIG. 11, a schematic structural diagram of a computer system 1100 adapted to implement an electronic device of the embodiments of the present disclosure is shown. The electronic device as shown in FIG. 11 is merely an example, and no limitation should be imposed on functions or scope of use of the embodiment of the present disclosure.

As shown in FIG. 11, the computer system 1100 includes a central processing unit (CPU) 1101, which may execute various appropriate actions and processes in accordance with a program stored in a read-only memory (ROM) 1102 or a program loaded into a random access memory (RAM) 1103 from a storage portion 1108. The RAM 1103 also stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: an input portion 1106 including a keyboard, a mouse etc.; an output portion 1107 comprising a cathode ray tube (CRT), a liquid crystal display device (LCD), a speaker etc.; a storage portion 1108 including a hard disk and the like; and a communication portion 1109 comprising a network interface card, such as a LAN card and a modem. The communication portion 1109 performs communication processes via a network, such as the Internet. A driver 1110 is also connected to the I/O interface 1105 as required. A removable medium 1111, such as a magnetic disk, an optical disk, a magneto-optical disk, and a semiconductor memory, may be installed on the driver 1110, to facilitate the retrieval of a computer program from the removable medium 1111, and the installation thereof on the storage portion 1108 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 1109, and/or may be installed from the removable media 1111. The computer program, when executed by the central processing unit (CPU) 1101, implements the above mentioned functionalities as defined by the methods of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring unit, an extending unit, an adding unit, and a generating unit, where the names of these units or modules are not considered as a limitation to the units or modules. For example, the acquiring unit may also be described as "a unit for acquiring a target historical query statement."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire a target historical query statement from a historical query statement collection; extend the target historical query statement based on a query log to generate an extended statement fragment associated with the target historical query statement; add the extended statement fragment, as a statement fragment characteristic associated with the target historical query statement, into a statement fragment characteristic library of a preset model, the preset model comprising a domain recognition model and/or an intent slot recognition model, the domain recognition model being configured to characterize a corresponding relationship between a query statement and a preset domain, a semantic meaning of the query statement belonging to the preset domain, the intent slot recognition model being configured to characterize a corresponding relationship between a query statement and a query intent indicated by the query statement, and a corresponding relationship between a query statement and a limiting keyword of the query intent; and generate a query result corresponding to a query statement based on the statement fragment characteristic library of the preset model in response to receiving the query statement.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A query method, comprising:
   acquiring a target historical query statement from a historical query statement collection;
   extending the target historical query statement based on a query log to generate an extended statement fragment associated with the target historical query statement;
   adding the extended statement fragment, as a statement fragment characteristic associated with the target historical query statement, into a statement fragment characteristic library of a preset model, the preset model comprising a domain recognition model and/or an intent slot recognition model, the domain recognition model being configured to characterize a corresponding relationship between a query statement and a preset domain to which a semantic meaning of the query statement belongs, the intent slot recognition model being configured to characterize a corresponding relationship between a query statement and a query intent indicated by the query statement, and a corresponding relationship between a query statement and a limiting keyword of the query intent; and
   generating a query result corresponding to a query statement based on the statement fragment characteristic library of the preset model in response to receiving the query statement.

2. The query method according to claim 1, wherein the extending the target historical query statement based on a query log to generate an extended statement fragment comprises:
   performing a word segmentation on the target historical query statement using various preset word segmentation approaches to generate a plurality of statement fragments; and
   selecting a preset number of statement fragments from the plurality of statement fragments in an order of user selection probabilities from a highest to a lowest as the extended statement fragments, or selecting a statement fragment having a user selection probability higher than a probability threshold as the extended statement fragment, the user selection probability being determined by a number of historical clicks of each statement fragment among each group of statement fragments in the query result recorded in the query log.

3. The query method according to claim 1, wherein the extending the target historical query statement based on a query log to generate an extended statement fragment comprises:
   performing a word segmentation on the target historical query statement using various preset word segmentation approaches to generate a plurality of statement fragments; and
   for a statement fragment among the plurality of statement fragments, determining a title of a historical user selection page corresponding to the statement fragment serving as the query statement; performing a word segmentation on the title to generate at least two statement fragments of the title; and determining a weight value of each statement fragment of the title, and determining the statement fragment having a weight value higher than a preset weight threshold as the extended statement fragment.

4. The query method according to claim 1, wherein the extending the target historical query statement based on a query log to generate an extended statement fragment comprises:
   in response to determining that for a first target fragment in the target historical query statement and a second target fragment in a title of a historical user selection page corresponding to the target historical query statement, a probability in unilateral contextual consistency in the statement is greater than a first preset threshold or a probability in bilateral contextual consistency is greater than a second preset threshold, determining the first target fragment and the second target fragment as synonymous fragments, and determining the second target fragment as the extended statement fragment, a record selected for the historical user selection page being recorded into the query log.

5. The query method according to claim 1, wherein the extending the target historical query statement based on a query log to generate an extended statement fragment comprises:
   in response to determining that within a designated historical period, the first target fragment is positioned in the target historical query statement and a probability of a second target fragment positioned in titles of a plurality of historical user selection pages corresponding to the target historical query statement is greater than a preset threshold, determining the first target fragment and the second target fragment as synonymous fragments, and determining the second target fragment as the extended statement fragment, a record selected for the historical user selection page being recorded into the query log.

6. The query method according to claim 1, wherein the extending the target historical query statement based on a query log to generate an extended statement fragment comprises:
   determining, based on a deep neural network, a semantic similarity between a first target fragment in the target historical query statement and a second target fragment in a title of a historical user selection page corresponding to the target historical query statement, a record selected for the historical user selection page being recorded into the query log; and
   in response to determining the semantic similarity is above a preset similarity threshold, determining the first target fragment and the second target fragment as synonymous fragments, and determining the second target fragment as the extended statement fragment.

7. The query method according to claim 4, wherein after the determining the first target fragment and the second target fragment as synonymous fragments, the extending the target historical query statement based on the query log to generate the extended statement fragment further comprises:
  pushing to-be-confirmed synonymous fragment information comprising the first target fragment and the second target fragment to a client; and
  in response to receiving confirmed synonymous fragment information returned by the client, determining the first target fragment and the second target fragment as confirmed synonymous fragments.

8. The query method according to claim 1, further comprising:
  in response to determining that the target historical query statement comprises a to-be-confirmed statement fragment and a query intent fragment in a preset query intent fragment collection, determining whether the target historical query statement is present in the query log; and
  in response to determining that the target historical query statement is present in the query log, adding a specified tag used for indicating a modification function for the to-be-confirmed statement fragment in the statement fragment characteristic library.

9. The query method according to claim 1, wherein the generating a query result corresponding to a query statement based on the statement fragment characteristic library of the preset model comprises:
  in response to the preset model comprising the domain recognition model and the intent slot recognition model, determining at least one domain recognition model matching the query statement and a preset domain corresponding to the at least one domain recognition model from a plurality of domain recognition models based on the statement fragment characteristic library of each one of the plurality of domain recognition models;
  for each preset domain, inputting the query statement into the intent slot recognition model corresponding to the preset domain to obtain the query intent indicated by the query statement and the limiting keyword of the query intent based on matching between the query statement and the statement fragment characteristic in the statement fragment characteristic library of the intent slot recognition model; and
  searching for information matching the query intent and the limiting keyword from an information library, and determining the information searched out as the query result.

10. A query apparatus, comprising:
  at least one processor; and
  a memory storing instructions, which when executed by the at least one processor, cause the at least one processor to perform operations, the operations comprising:
  acquiring a target historical query statement from a historical query statement collection;
  extending the target historical query statement based on a query log to generate an extended statement fragment associated with the target historical query statement;
  adding the extended statement fragment, as a statement fragment characteristic associated with the target historical query statement, into a statement fragment characteristic library of a preset model, the preset model comprising a domain recognition model and/or an intent slot recognition model, the domain recognition model being configured to characterize a corresponding relationship between a query statement and a preset domain to which a semantic meaning of the query statement belongs, the intent slot recognition model being configured to characterize a corresponding relationship between a query statement and a query intent indicated by the query statement, and a corresponding relationship between a query statement and a limiting keyword of the query intent; and
  generating a query result corresponding to a query statement based on the statement fragment characteristic library of the preset model in response to receiving the query statement.

11. The query apparatus according to claim 10, wherein the extending the target historical query statement based on a query log to generate an extended statement fragment comprises:
  performing a word segmentation on the target historical query statement using various preset word segmentation approaches to generate a plurality of statement fragments; and
  selecting a preset number of statement fragments from the plurality of statement fragments in an order of user selection probabilities from a highest to a lowest as the extended statement fragments, or selecting a statement fragment having a user selection probability higher than a probability threshold as the extended statement fragment, the user selection probability being determined by a number of historical clicks of each statement fragment among each group of statement fragments in the query result recorded in the query log.

12. The query apparatus according to claim 10, wherein the extending the target historical query statement based on a query log to generate an extended statement fragment comprises:
  performing a word segmentation on the target historical query statement using various preset word segmentation approaches to generate a plurality of statement fragments; and
  for a statement fragment among the plurality of statement fragments, determining a title of a historical user selection page corresponding to the statement fragment serving as the query statement; performing a word segmentation on the title to generate at least two statement fragments of the title; and determining a weight value of each statement fragment of the title, and determining the statement fragment having a weight value higher than a preset weight threshold as the extended statement fragment.

13. The query apparatus according to claim 10, wherein the extending the target historical query statement based on a query log to generate an extended statement fragment comprises:
  in response to determining that for a first target fragment in the target historical query statement and a second target fragment in a title of a historical user selection page corresponding to the target historical query statement, a probability in unilateral contextual consistency in the statement is greater than a first preset threshold or a probability in bilateral contextual consistency is greater than a second preset threshold, determining the first target fragment and the second target fragment as synonymous fragments, and determining the second target fragment as the extended statement fragment, a record selected for the historical user selection page being recorded into the query log.

14. The query apparatus according to claim 13, wherein the extending the target historical query statement based on the query log to generate the extended statement fragment further comprises:

pushing to-be-confirmed synonymous fragment information comprising the first target fragment and the second target fragment to a client; and in response to receiving confirmed synonymous fragment information returned by the client, determining the first target fragment and the second target fragment as confirmed synonymous fragments.

15. A non-transitory computer storage medium storing a computer program, which when executed by a processor, causes the processor to perform operations, the operations comprising:

acquiring a target historical query statement from a historical query statement collection;

extending the target historical query statement based on a query log to generate an extended statement fragment associated with the target historical query statement;

adding the extended statement fragment, as a statement fragment characteristic associated with the target historical query statement, into a statement fragment characteristic library of a preset model, the preset model comprising a domain recognition model and/or an intent slot recognition model, the domain recognition model being configured to characterize a corresponding relationship between a query statement and a preset domain to which a semantic meaning of the query statement belongs, the intent slot recognition model being configured to characterize a corresponding relationship between a query statement and a query intent indicated by the query statement, and a corresponding relationship between a query statement and a limiting keyword of the query intent; and generating a query result corresponding to a query statement based on the statement fragment characteristic library of the preset model in response to receiving the query statement.

* * * * *